US010042214B2

(12) United States Patent
Kwak et al.

(10) Patent No.: US 10,042,214 B2
(45) Date of Patent: Aug. 7, 2018

(54) LIQUID CRYSTAL DISPLAY AND MANUFACTURING METHOD THEREOF

(71) Applicant: Samsung Display Co., Ltd., Yongin-si (KR)

(72) Inventors: Chang Hun Kwak, Suwon-si (KR); Hye Ran Mun, Yangju-si (KR); Chul Huh, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 139 days.

(21) Appl. No.: 14/934,981

(22) Filed: Nov. 6, 2015

(65) Prior Publication Data
US 2016/0259205 A1   Sep. 8, 2016

(30) Foreign Application Priority Data

Mar. 2, 2015 (KR) .................. 10-2015-0029337

(51) Int. Cl.
*G02F 1/1333* (2006.01)
*G02F 1/1339* (2006.01)
*G02F 1/1362* (2006.01)

(52) U.S. Cl.
CPC .... *G02F 1/13394* (2013.01); *G02F 1/136209* (2013.01); *G02F 2001/13396* (2013.01); *G02F 2001/133388* (2013.01); *G02F 2001/136222* (2013.01)

(58) Field of Classification Search
None
See application file for complete search history.

(56) References Cited

U.S. PATENT DOCUMENTS

| 2013/0329155 A1 | 12/2013 | Kwak et al. |
| 2014/0049717 A1 | 2/2014 | Kwak et al. |
| 2016/0216550 A1* | 7/2016 | Park .................. G02F 1/133512 |

FOREIGN PATENT DOCUMENTS

| KR | 1020110086374 | 7/2011 |
| KR | 1020130137457 | 12/2013 |

* cited by examiner

*Primary Examiner* — Richard Kim
(74) *Attorney, Agent, or Firm* — Cantor Colburn LLP

(57) ABSTRACT

A manufacturing method of a liquid crystal display includes forming display pixels which display an image and dummy pixels which do not display the image on a lower substrate including a display area and a non-display area positioned in at least one side outside the display area, coating a light blocking member material layer on a first dead space area adjacent to the display area and having a dummy area where the dummy pixels are positioned, a second dead space area adjacent to the first dead space area, and a third dead space area adjacent to the second dead space area in the non-display area, and forming first to third light blocking members through exposure by using an optical mask in which at least two or more halftone regions and a full-tone region are mixed.

11 Claims, 13 Drawing Sheets

LIQUID CRYSTAL DISPLAY AND MANUFACTURING METHOD THEREOF

This application claims priority to Korean Patent Application No. 10-2015-0029337 filed on Mar. 2, 2015, and all the benefits accruing therefrom under 35 U.S.C. § 119, the content of which in its entirety is herein incorporated by reference.

BACKGROUND (a) Field

The invention relates to a liquid crystal display ("LCD") and a manufacturing method thereof, and more particularly, to an LCD and a manufacturing method thereof which prevent a gap defect and a torn pattern of a light blocking area in an outermost cell of a display area adjacent to a non-display area while preventing light leakage of an outermost pixel by improving a light blocking member.

(b) Description of the Related Art

A liquid crystal display ("LCD") which is one of the most common types of flat panel displays currently in use, includes two display panels with electrodes and a liquid crystal layer inserted therebetween. The LCD is a display device which rearranges liquid crystal molecules of the liquid crystal layer by applying a voltage to the electrodes to control an amount of transmitted light.

In the LCD, a structure in which field generating electrodes are provided on two display panels is mainly used currently. Among them, a structure in which a plurality of thin film transistors ("TFTs") and pixel electrodes are arranged in a matrix on one display panel (hereinafter, also referred to as 'TFT display panel') and color filters such as red, green, and blue color filters are formed on the other display panel (hereinafter, also referred to as 'common electrode display panel') and a common electrode covers a full surface thereof is now currently used.

However, in the LCD, since the pixel electrode and the color filter are disposed on different display panels, it is difficult to accurately align the pixel electrode and the color filter, such that an alignment error may be generated. In order to solve the problem, a color filter on array ("COA") structure in which the color filter and the pixel electrode are formed on the same display panel is proposed.

Further, when the TFT array panel and the common electrode panel are assembled with each other, considering an assembling margin, a light blocking member such as a black matrix needs to be manufactured to be larger than a predetermined size.

However, in this case, since an aperture ratio may be decreased by the increased size of the black matrix, the black matrix may be formed on the TFT array panel.

A gap of liquid crystal layers between the two display panels is called a cell gap, and the cell gap has an influence on overall operational characteristics of the LCD such as a responses speed, a contrast ratio, a viewing angle, and luminance uniformity. When the cell gap is not uniform, a uniform image is not displayed over the entire screen to cause an image quality defect. Accordingly, in order to maintain the uniform cell gap all over the entire area on the substrate, a plurality of spacers is formed at one side of two substrates.

The plurality of spacers may include a main column spacer supporting two substrates and a sub column spacer assisting a hole of the main column spacer.

In order to simplify a process, the light blocking member such as a black matrix and the spacers may be simultaneously formed. When the light blocking member, the main column spacer, the sub column spacer, and the like are simultaneously formed, it is required to implement a multi-step.

SUMMARY

In order to implement the multi-step, a mask that can implement multi-transmittance and a material that can implement the multi-step are required, but currently, there is a limit to implement multi-transmittance in the mask and the material that can implement the multi-step are not yet developed.

The invention has been made in an effort to provide a liquid crystal display ("LCD") and a manufacturing method thereof having advantages of preventing a gap defect and a torn pattern from being generated in a cell of an active area which is most adjacent to a dead space area.

An exemplary embodiment of the invention provides an LCD including a lower substrate including a display area and a non-display area positioned in at least one side outside the display area, a plurality of pixels positioned on the lower substrate and including display pixels positioned in the display area and dummy pixels which do not display the image, and a light blocking member positioned on the lower substrate, in which the non-display area is adjacent to the display area and includes a first dead space area having a dummy area where the dummy pixels are positioned, a second dead space area adjacent to the first dead space area, and a third dead space area adjacent to the second dead space area, the light blocking member includes a first light blocking member positioned in the first dead space area, a second light blocking member positioned in the second dead space area, and a third light blocking member positioned in the third dead space area, and the first to third light blocking members have first to third thicknesses formed by using an optical mask in which at least one halftone region and a full-tone region are mixed.

Another exemplary embodiment of the invention provides a manufacturing method of an LCD including forming display pixels which display an image and dummy pixels which do not display the image on a lower substrate including a display area and a non-display area positioned in at least one side outside the display area, coating a light blocking member material layer on a first dead space area adjacent to the display area and having a dummy area where the dummy pixels are positioned, a second dead space area adjacent to the first dead space area, and a third dead space area adjacent to the second dead space area in the non-display area, and forming first to third light blocking members through exposure by using an optical mask in which at least two or more halftone regions and a full-tone region are mixed.

According to the exemplary embodiment of the invention, it is possible to prevent light leakage in an outermost pixel of a display area adjacent to a non-display area, reduce possibility of generating a gap defect, and prevent a surface unfilled area ("SUA") in which a void is generated on an interface.

Further, in the LCD and the manufacturing method thereof according to the exemplary embodiment of the invention, it is possible to solve reduction of a critical dimension ("CD") and a remaining film by preventing a gap defect and a torn pattern in the outermost pixel of the display area adjacent to the non-display area.

Further, in the LCD and the manufacturing method thereof according to the exemplary embodiment of the invention, it is possible to prevent a gap defect and a torn pattern from being generated in a cell of an active area which is most adjacent to a dead space area by forming a light blocking member in which at least two or more different halftones and full-tones are mixed as far away from a nearest display pixel in order to light-block the dead space area.

Further, in the LCD and the manufacturing method thereof according to the exemplary embodiment of the invention, it is possible to prevent a gap defect and a torn pattern from being generated by preventing a step from being increased by using a dummy color pattern as a lower support layer and forming a light blocking member of a halftone thereon.

Further, in the LCD and the manufacturing method thereof according to the exemplary embodiment of the invention, it is possible to prevent a torn pattern and a defect in a light blocking area from being generated and a CD and a remaining film from being reduced by overdeveloping the light blocking area formed with a halftone in an outermost pixel by entirely forming a full-tone light blocking member only in a dead space area which is far away from the display area.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
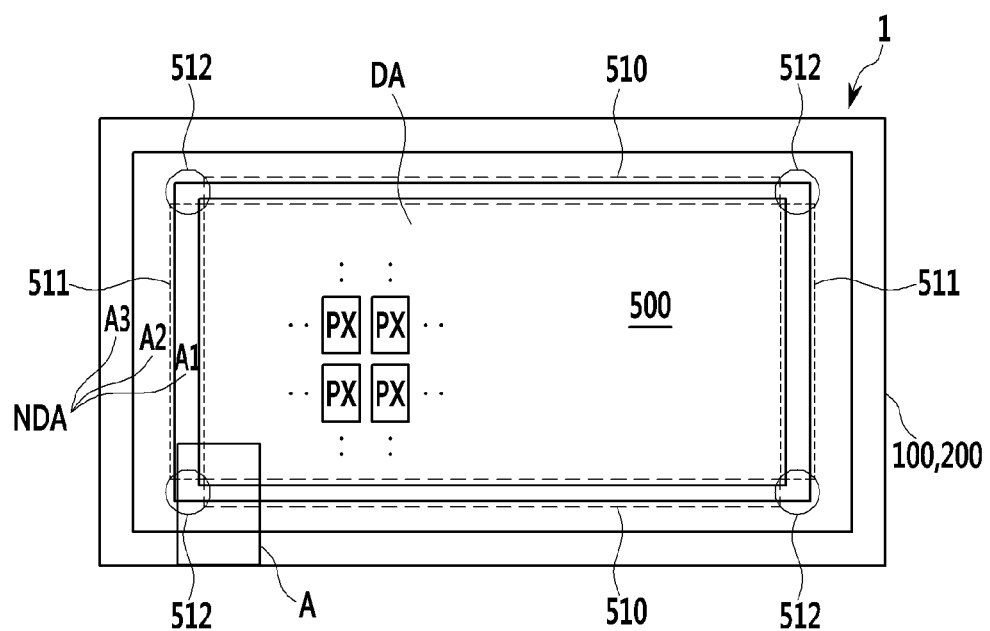
FIG. 1 is a schematic plan view of an exemplary embodiment of a liquid crystal display ("LCD") according to the invention.

Hereinafter, exemplary embodiments of the invention will be described in detail with reference to the accompanying drawings. As those skilled in the art would realize, the described embodiments may be modified in various different ways, all without departing from the spirit or scope of the invention. On the contrary, exemplary embodiments introduced herein are provided to make disclosed contents thorough and complete and sufficiently transfer the spirit of the invention to those skilled in the art.

As those skilled in the art would realize, the described embodiments may be modified in various different ways, all without departing from the spirit or scope of the invention. As those skilled in the art would realize, the described embodiments may be modified in various different ways, all without departing from the spirit or scope of the invention. Accordingly, the drawings and description are to be regarded as illustrative in nature and not restrictive. Like reference numerals designate like elements throughout the specification. In addition, the detailed description of the widely known technologies will be omitted.

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. In contrast, when an element is referred to as being "directly on" another element, there are no intervening elements present. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a liquid crystal display ("LCD") according to an exemplary embodiment of the invention will be described in detail with reference to the accompanying drawings.

FIG. 1 is a plan view of an LCD according to an exemplary embodiment of the invention.

In FIG. 1, a plan view of the LCD is illustrated. An LCD 1 includes a lower substrate 100 and an upper substrate 200 facing each other, and a liquid crystal layer (not shown) therebetween when viewed from a cross-sectional structure. The lower substrate 100 includes a display area DA which is an area where an image is displayed and a non-display area NDA around the display area DA. The LCD includes a plurality of pixels when viewed from a planar structure, and the plurality of pixels may be arranged in a matrix form. The plurality of pixels is disposed on the lower substrate 100.

The pixels are divided into display pixels PX that display the image and dummy pixels that do not display the image. The display pixels PX are positioned in the display area DA 500, and the dummy pixels are positioned in at least one side of the non-display area NDA which is an outer side of the display area 500.

In the exemplary embodiment of FIG. 1, all of the dummy pixels are disposed outside the display area 500, but in another exemplary embodiment, the dummy pixels may be positioned only at one side.

The dummy pixels are positioned in dummy areas 510, 511, and 512. The dummy areas 510, 511, and 512 includes a horizontal dummy area 510 positioned at the top and the bottom of the display area 500, a vertical dummy area 511 positioned at the left and the right of the display area 500, and an edge dummy area 512 positioned at an edge of the display area 500. At least one of the dummy areas 510, 511, and 512 may be provided, and thus various dummy areas 510, 511, and 512 may be provided in various exemplary embodiments.

The horizontal dummy area 510 includes a plurality of dummy pixels arranged in at least one row, and the vertical dummy area 511 may include a plurality of dummy pixels arranged in at least one column.

In the exemplary embodiment of FIG. 1, the horizontal dummy area 510 includes dummy pixels in one row, and the vertical dummy area 511 includes dummy pixel in one column.

The edge dummy area 512 is disposed at a position where the horizontal dummy area 510 and the vertical dummy area 511 are extended to meet with each other.

The display pixel PX includes a thin film transistor ("TFT"), a pixel electrode, a common electrode, and a liquid crystal layer between the pixel electrode and the common electrode. The TFT is disposed on the lower substrate 100 and connected to a gate line and a data line which are insulated from each other to cross each other. The other terminal of the TFT is connected with the pixel electrode. A color filter and a light blocking member may be positioned between the TFT and the pixel electrode. The light blocking member may be positioned even between adjacent pixels. The color filter and the light blocking member may be disposed below the pixel electrode and on the TFT.

Since the dummy pixel does not display an image, various exemplary embodiments of the structure may exist. That is, the dummy pixel may not include at least one of the TFT, the pixel electrode, the common electrode, and the liquid crystal layer included in the display pixel PX.

In an exemplary embodiment, the dummy pixel may include a TFT and a pixel electrode. Further, according to an exemplary embodiment, the dummy pixel may include a color filter or a light blocking member. The color filter or the light blocking member may be positioned between the TFT and the pixel electrode.

In the exemplary embodiment of FIG. 1, the dummy areas 510, 511, and 512 are disposed outside the display area 500 and configured by dummy pixels in one row or one column. However, according to an exemplary embodiment, the dummy areas 510, 511, and 512 are configured by dummy pixels in two or more rows or two or more columns. Whether the dummy area is provided with the dummy pixels or provided with the display pixels PX is determined by whether a height of a microcavity is constantly provided according to a specification of the device or not suitable for the specification of the device.

The color filter and the light blocking member may be disposed below the pixel electrode and on the TFT. The dummy pixels may have the same layered structure as that of the display pixels PX, but may have a structure in which at least one constituent element is deleted. This is because the dummy pixel does not display the actual image.

Figure 2:
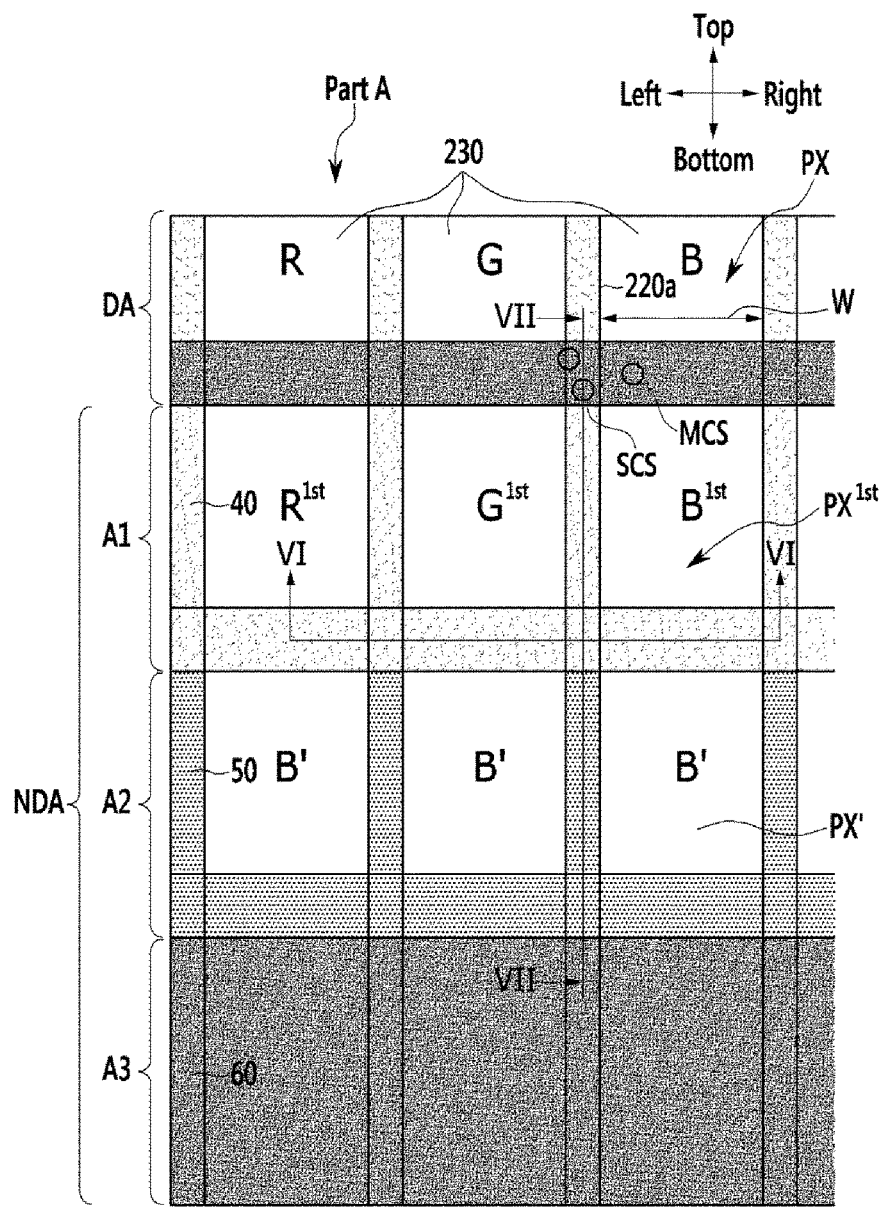
FIG. 2 is an enlarged diagram of a part A of FIG. 1.
Figure 7:
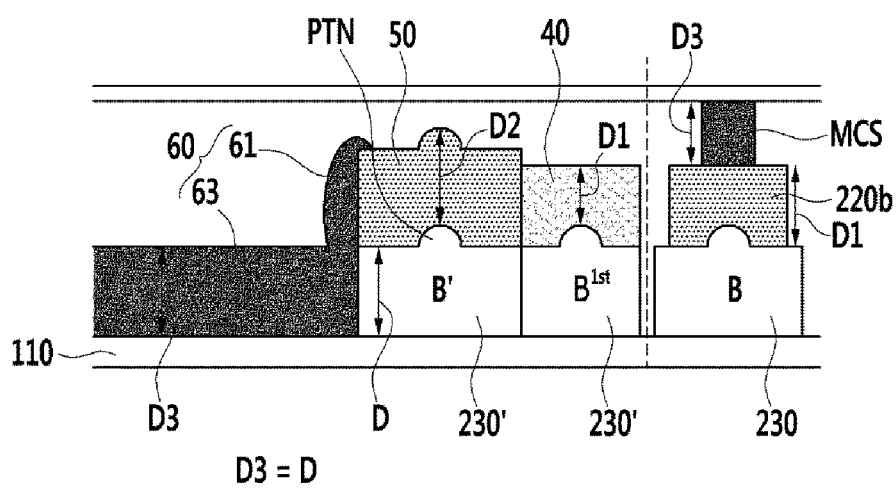
FIG. 7 is a cross-sectional view of FIG. 2 taken along line VII-VII.

As illustrated in FIGS. 2 and 7, in the non-display area NDA, a first dead space area A1, a second dead space area A2, and a third dead space area A3 are sequentially positioned in a direction far from the display pixel PX which is nearest to the non-display area NDA. The first dead space area A1 includes dummy areas 510, 511, and 512 where the dummy pixels are positioned and may be provided in a range of approximately 100 micrometers (μm) to approximately 200 μm from the edge of the display area DA. The second dead space area A2 may be adjacent to the first dead space area A1 and have a diode and a contact pad, and may be provided in a range of approximately 200 μm to approximately 800 μm from the edge of the display area DA. The third dead space area A3 may be an area from the edge of the second dead space area A2 to an end of the non-display area NDA, that is, an area distant from the edge of the display area DA by about 800 μm to an end of the non-display area NDA.

The display pixel PX may display red R, green G, and blue B according to a color of a color filter layer 230, and a light blocking part 220a may be provided between the display pixels PX in order to prevent color spreading.

The non-display area NDA, particularly, the first dead space area A1 is configured by dummy pixels in a first row or a first column of the dummy areas 510, 511, and 512, and the color filter layer 230 may be provided in a first dummy pixel $PX^{1st}$ which is nearest to the display area DA like the display area DA.

In the first dummy pixel $PX^{1st}$ including red $R^{1st}$ green $G^{1st}$, and blue $B^{1st}$ may be displayed according to a color of a dummy color filter layer 230' like the color filter layer 230 of the display pixel PX, and each first dummy pixel $PX^{1st}$ may be surrounded by a first light blocking member 40 so as to have the same width as a width W of the display pixel PX.

In the second dead space area A2, a diode, a contact pad, and the like may be installed, dummy pixels PX' disposed in the second dead space area A2 may have dummy color filter layers 230' like the display pixels PX, but one color, blue B' in the invention may be provided in each dummy pixel PX'. Each blue B' dummy pixel PX' may be surrounded by a second light blocking member 50 so as to have the same width as a width W of the display pixel PX.

In the third dead space area A3, the color filter layer 230 is not provided, but a third light blocking member 60 may be entirely provided.

The first to third light blocking members 40, 50, and 60 are installed in order to maintain a gap of the liquid crystal layer positioned between the upper substrate 200 and the lower substrate 100 in the non-display area NDA.

However, in the case of using a full-tone light blocking member in order to light-block the existing dead space areas A1, A2, and A3, a developer is rarely permeated during developing, and thus overdeveloping occurs due to a developer at a high concentration when developing the light blocking member positioned in the display area DA adjacent to the dead space areas A1, A2, and A3. As a result, in the pixel PX of the display area 500 which is nearest to the dead space areas A1, A2, and A3, the gap defect and the torn pattern are generated.

In order to solve the problems, a light blocking member is disposed on the dummy color filter layer of the dummy areas 510, 511, and 512 with a full tone, but in this case, the gap defect and the torn pattern are generated due to an increase in step. Further, a surface unfilled area ("SUA") where a liquid crystal is not filled in an interface to generate a void is caused.

Further, in the case of forming the light blocking member all over the dead space areas A1, A2, and A3 with a full tone, the developer is rarely permeated during developing and thus reduction in a height due to the developer is rarely generated. In addition, due to the overdeveloping of the developer, the light blocking area disposed in the outermost pixel of the display area 500 adjacent to the dead space areas A1, A2, and A3 with a half tone is overdeveloped, and thus the torn pattern defect in the light blocking area is generated and the critical dimension ("CD") and the remaining film are reduced.

Hereinafter, in the LCD according to the exemplary embodiment of the invention, the light blocking member in the non-display area will be described.

To this end, characteristics of the light blocking member of one pixel of a display area of the LCD according to the exemplary embodiment of the invention will be described with reference to FIGS. 2 and 3 to 5.

Figure 3:
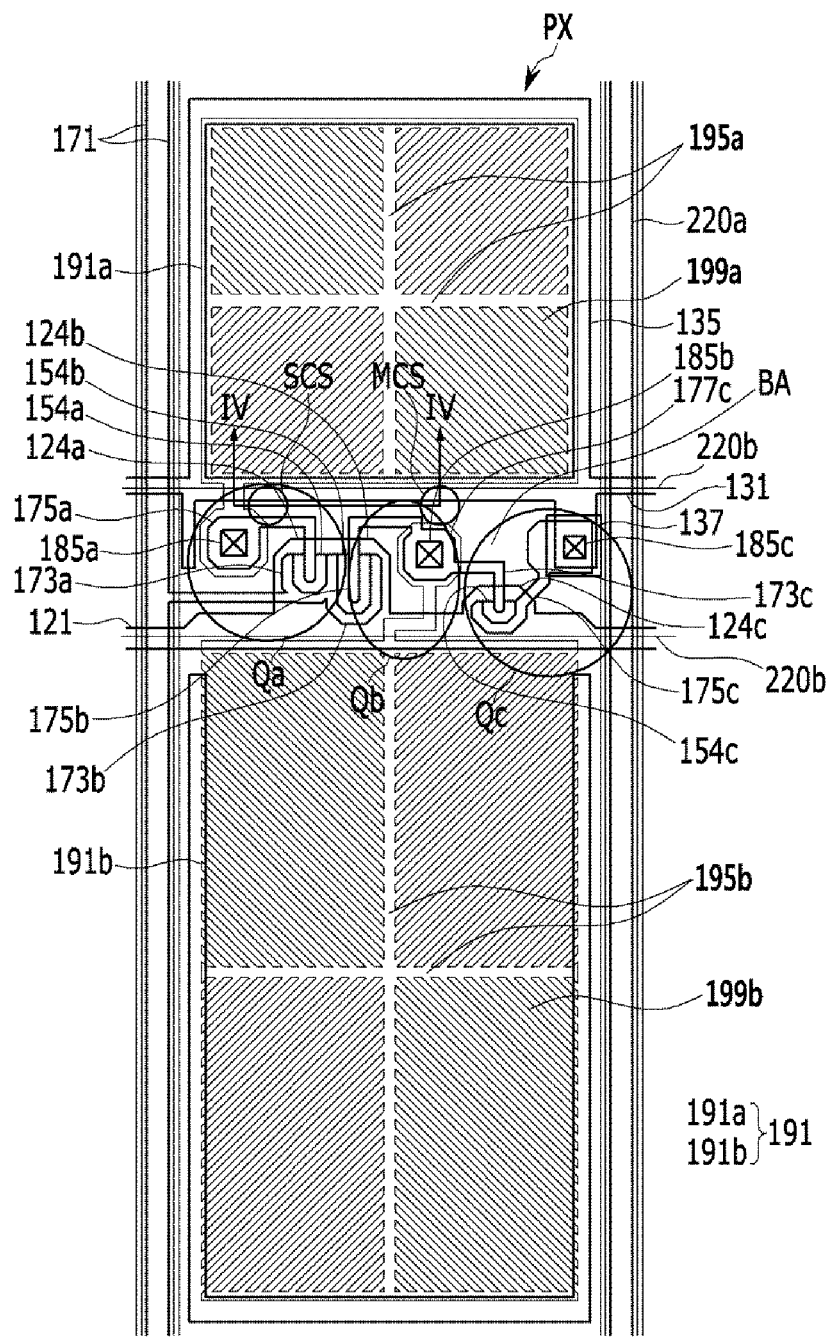
FIG. 3 is a plan view of the exemplary embodiment of one pixel of the LCD according to the invention.
Figure 4:
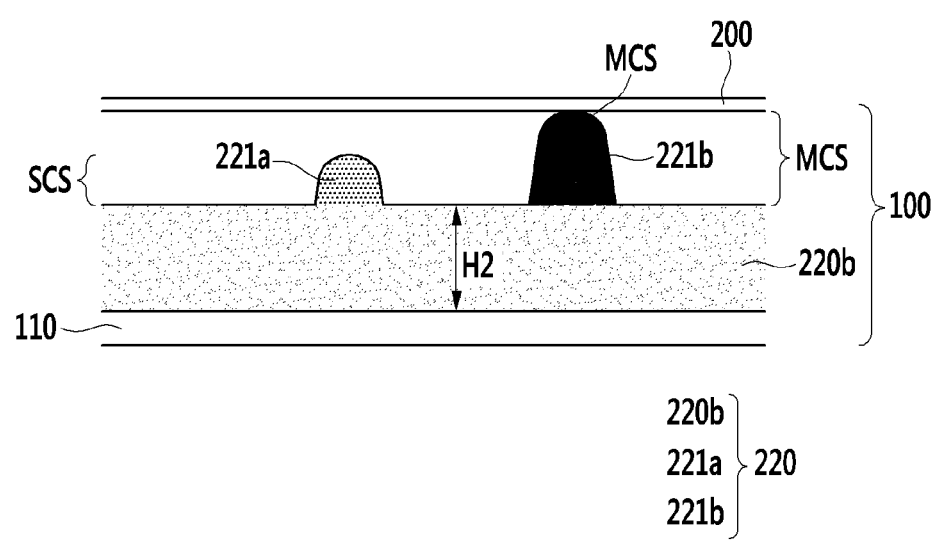
FIG. 4 is a cross-sectional view of the LCD illustrated in FIG. 3 taken along line IV-IV.
Figure 5:
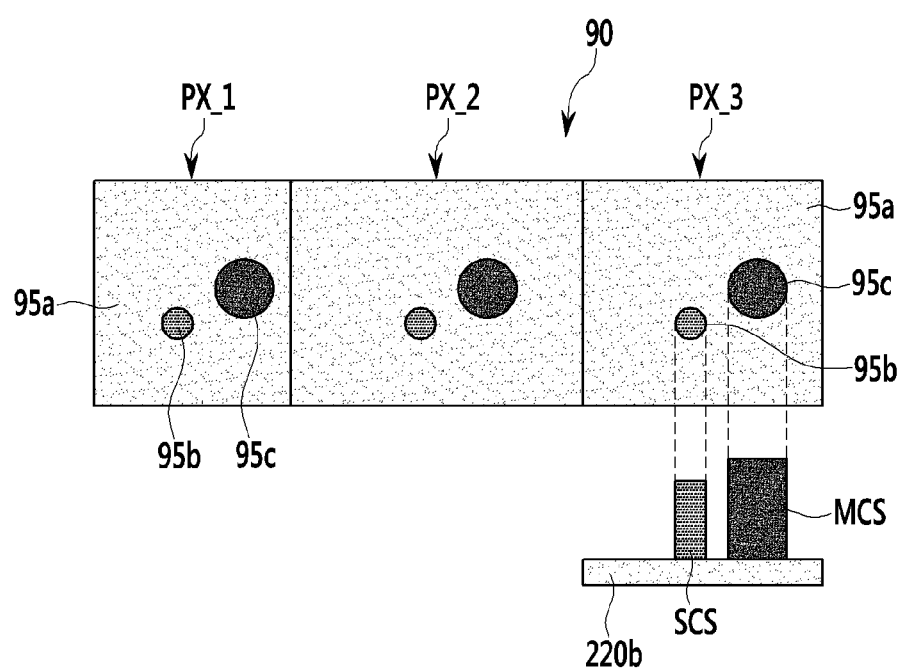
FIG. 5 is a diagram illustrating a plan view of the exemplary embodiment of an optical mask for forming a light blocking member in a display area of the LCD according to the invention and a schematic cross-sectional view of a light blocking member corresponding to the optical mask.

FIG. 3 is a plan view of one pixel of a display area of the LCD according to the exemplary embodiment of the invention, FIG. 4 is a cross-sectional view of the LCD illustrated in FIG. 3 taken along line IV-IV, and FIG. 5 is a diagram illustrating a plan view of an optical mask for forming a light blocking member in a display area of the LCD according to the exemplary embodiment of the invention and a schematic cross-sectional view of a light blocking member corresponding to the optical mask.

As illustrated in FIGS. 3 and 4, the LCD according to the exemplary embodiment include a lower panel 100 and an upper panel 200 facing each other, and a liquid crystal layer interposed between the two panels.

First, the lower panel 100 will be described.

A plurality of gate conductors including a plurality of gate lines including a gate line 121 and a plurality of storage electrode lines 131 is disposed on a first substrate 110 including a pixel area.

The gate line 121 mainly extends in a horizontal direction and transfer gate signals. The gate line 121 includes a first gate electrode 124a, a second gate electrode 124b and a third gate electrode 124c protruding upward. The first gate electrode 124a and the second gate electrode 124b are connected to each other to form one protrusion.

The storage electrode line 131 mainly extends in a horizontal direction and transfers a predetermined voltage such as a common voltage. The storage electrode line 131 includes storage electrode 135 protruding upward, a pair of vertical portions 137 extending downward to be substantially vertical to the gate line 121.

A gate insulating layer is disposed on the gate conductors 121 and 131.

A plurality of semiconductor stripes including amorphous or crystalline silicon is disposed on the gate insulating layer. The semiconductor stripes may mainly extend in a vertical direction, and include first and second semiconductors 154a and 154b which extend toward the first and second gate electrodes 124a and 124b and are connected with each other, and a third semiconductor 154c connected with the second semiconductor 154b positioned on the third gate electrode 124c.

A plurality of ohmic contacts (not illustrated) may be disposed on the semiconductors 154a, 154b, and 154c. In an exemplary embodiment, the ohmic contact may include silicide or a material such as n+ hydrogenated amorphous silicon in which an n-type impurity is doped at a high concentration.

A data conductor including a plurality of data lines 171, a plurality of first drain electrodes 175a, a plurality of second drain electrodes 175b, and a plurality of third drain electrodes 175c is disposed on the ohmic contact.

The data line 171 transfers a data signal and mainly extends in a vertical direction to cross the gate line 121. Each data line 171 includes a first source electrode 173a and a second source electrode 173b which extend toward the first gate electrode 124a and the second gate electrode 124b and are connected to each other.

Each of the first drain electrode 175a, the second drain electrode 175b, and the third drain electrode 175c includes one wide end portion and the other rod-shaped end portion. The rod-shaped end portions of the first drain electrode 175a and the second drain electrode 175b are partially surrounded by the first source electrode 173a and the second source electrode 173b. One wide end portion of the first drain electrode 175a is again extended to form a third drain electrode 175c which is bent in a 'U' shape. A wide end portion 177c of the third source electrode 173c is connected to second subpixel electrode 191b via the second contact hole 185b, and the rod-shaped end portion is partially surrounded by the third drain electrode 175c.

The first gate electrode 124a, the first source electrode 173a, and the first drain electrode 175a form a first TFT Qa together with the first semiconductor 154a, the second gate electrode 124b, the second source electrode 173b, and the second drain electrode 175b form a second TFT Qb together with the second semiconductor 154b, and the third gate electrode 124c, the third source electrode 173c, and the third drain electrode 175c form a third TFT Qc together with the third semiconductor 154c.

The semiconductor stripe including the first semiconductor 154a, the second semiconductor 154b, and the third semiconductor 154c may have substantially the same planar shape as the data conductor 171, 173a, 173b, 173c, 175a, 175b, and 175c and the ohmic contacts therebelow, except for channel regions between the source electrodes 173a, 173b, and 173c and the drain electrodes 175a, 175b, and 175c.

In the first semiconductor 154a, an exposed portion which is not covered by the first source electrode 173a and the first drain electrode 175a is disposed between the first source electrode 173a and the first drain electrode 175a. In the second semiconductor 154b, an exposed portion which is not covered by the second source electrode 173b and the second drain electrode 175b is disposed between the second source electrode 173b and the second drain electrode 175b. In addition, in the third semiconductor 154c, an exposed portion which is not covered by the third source electrode 173c and the third drain electrode 175c is disposed between the third source electrode 173c and the third drain electrode 175c.

In an exemplary embodiment, a passivation layer including an inorganic insulating material such as silicon nitride or silicon oxide is disposed on the data conductor 171, 173a, 173b, 173c, 175a, 175b, 175c and the exposed portions of the semiconductors 154a, 154b, and 154c.

A plurality of color filters 230 is positioned on the passivation layer. In an exemplary embodiment, the plurality of color filters 230 includes a red color filter, a green color filter, and a blue color filter which are arranged to be spaced part from each other. The plurality of color filters 230 are spaced apart from each other in a horizontal direction, respectively, but may be disposed in a striped shape in a vertical direction.

A second insulating layer may be further positioned on the color filter 230. The second insulating layer may include an inorganic insulating material or an organic insulating material.

The second insulating layer as an overcoat for the color filter 230 may prevent the color filter 230 from being exposed and provide a flat surface. The second insulating layer may prevent impurity such as a pigment of the color filter 230 from flowing into the liquid crystal layer. In another exemplary embodiment, the second insulating layer may be omitted.

A first contact hole 185a exposing a part of the first drain electrode 175a and a second contact hole 185b exposing a part of the second drain electrode 175b may be defined in the first insulating layer and the second insulating layer. The first and second contact holes 185a and 185b may be positioned in an opening of each color filter 230.

A contact hole 185c exposing a part of the third drain electrode 175c and a part of the protrusion 137 of the reference voltage line 131 may be further defined in the gate insulating layer and the first and second insulating layers.

A plurality of pixel electrodes and a plurality of contact assistants are positioned on the second insulating layer.

One pixel electrode may be configured by one electrode and may include a plurality of subpixel electrodes. In the exemplary embodiment, an example in which one pixel electrode includes a first subpixel electrode 191a and a second subpixel electrode 191b will be mainly described.

In an exemplary embodiment, the overall shape of each of the first subpixel electrode 191a and the second subpixel electrode 191b may be for example, a quadrangle. The first subpixel electrode 191a and the second subpixel electrode 191b may include cross stems 195a and 195b including horizontal stems and vertical stems, and a plurality of minute branches 199a and 199b extending outward from the cross stems 195a and 195b, respectively.

The first subpixel electrode 191a and/or the second subpixel electrode 191b is divided into a plurality of domains by the cross stems 195a and 195b. In an exemplary embodiment, the minute branches 199a and 199b extend obliquely from the cross stems 195a and 195b and may form an angle of approximately 45 degrees)(° or approximately 135° with the gate line 121. The extending directions of the minute branches 199a and 199b of the adjacent domains are different from each other, for example, may be orthogonal to each other.

The first subpixel electrode 191a and the second subpixel electrode 191b are physically and electrically connected with the first drain electrode 175a and the second drain electrode 175b through contact holes 185a and 185b, respectively. The first subpixel electrode 191a may receive a data voltage from the first drain electrode 175a, and the second subpixel electrode 191b may receive a divided voltage between the data voltage transferred through the second drain electrode 175b and the reference voltage transferred by the reference voltage line 131.

The third drain electrode 175c and the protrusion 135 of the reference voltage line 131 may be connected with each other through the contact assistant in the contact hole 185c.

In an exemplary embodiment, the first subpixel electrode 191a, the second subpixel electrode 191b, and the contact assistants may include a transparent conductive material such as indium tin oxide ("ITO"), indium zinc oxide ("IZO"), and a metal thin film.

In the exemplary embodiment, the layout and the form of the pixel PX, the structure of the TFT, and the shape of the pixel electrode are just one example, and may be variously modified.

As illustrated in FIGS. 3 and 4, the light blocking member 220 positioned in the light blocking area BA of the pixel PX of the display area DA includes a light blocking part 220b, a first spacer 221a, and a second spacer 221b.

Most of the light blocking part 220b is positioned in the light blocking area BA where the first to third TFTs Qa, Qb, and Qc are positioned and may have a substantially flat upper surface. The light blocking part 220b may prevent light leakage between an area where the first subpixel electrode 191a is positioned and an area where the second subpixel electrode 191b is positioned.

In an exemplary embodiment, a thickness H2 of the light blocking part 220b may be approximately 1 μm to approximately 2.5 μm and more particularly, approximately 2 μm, for example.

The first spacer 221a and the second spacer 221b are spaced apart from each other and connected to the light blocking part 220b.

The first spacer 221a and the second spacer 221b may be positioned on the first to third TFTs Qa, Qb, and Qc and/or the signal lines such as the gate line 121, the reference voltage line 131, and the data line 171.

In an exemplary embodiment, the first spacer 221a may be positioned on the first and second TFTs Qa and Qb, and the second spacer 221b may be positioned on a periphery of the TFT, that is, the outer side of the region where the TFT is positioned, for example, may be positioned on the gate line 121, but is not limited thereto.

The first spacer 221a and the second spacer 221b as sub spacers SCS may serve to maintain and support a cell gap between the upper panel 200 and the lower panel 100 when a distance between the upper panel 200 and the lower panel 100 is decreased by external pressure in the display device.

In an exemplary embodiment, a width of each of the first spacer 221a and the second spacer 221b may be approximately 30 μm to approximately 50 μm, for example, but is not limited thereto.

In an exemplary embodiment, the light blocking member 220 may include a pigment such as black carbon and include a photosensitive organic material.

The main spacer MCS may serve to maintain and support the cell gap between the upper panel 200 and the lower panel 100 in a general state. When the number of main spacers is increased, it is difficult to control the cell gap between the upper panel 200 and the lower panel 100 to be suitable for a volume change of the liquid crystal layer according to an environmental change such as a temperature and thus bubbles may be generated in the liquid crystal layer, and as a result, the number of main spacers may be limited.

The sub spacer SCS serves to assist the main spacer by maintaining the cell gap between the upper panel 200 and the lower panel 100 when external pressure is applied to the display device. When the number of sub spacers is decreased, the main spacer is permanently deformed and thus a display defect such as spots is shown, and as a result, it is advantageous that the number of sub spacers may be increased in the entire display device.

Like the exemplary embodiment of the invention, when the color filter layer 230 and the light blocking member 220 are positioned on the lower panel 100 together with the first to third TFTs Qa, Qb, and Qc, alignment among the light blocking member 220 and the color filter layer 230, the pixel electrode, and the TFTs Qa, Qb, and Qc is easily adjusted, thereby reducing an alignment error. Accordingly, it is possible to prevent light leakage or deterioration of an aperture ratio of the display device due to misalignment between the constituent elements and increase transmittance.

An alignment layer is disposed on the light blocking member 220, and may be a vertical alignment layer.

Referring to FIG. 5, according to the exemplary embodiment of the invention, an optical mask 90 includes a plurality of regions having different transmittances, and the plurality of regions may represent three different transmittances. The regions representing three transmittances may include a transparent region 95a with highest transmittance and first and second halftone regions 95b and 95c where light is partially transmitted.

In an exemplary embodiment, the transparent region 95a substantially transmits light and light transmittance thereof may be approximately 100 percent (%), and light transmittance of the first and second halftone regions 95b and 95c may be, for example, approximately 16% and approximately 19%, for example.

In the case where a remaining portion when a material layer of the color filter layer 230 transmits the light has negative photosensitivity, the optical mask 90 may include a transparent region 95c corresponding to the main spacer MCS described above, a main region 95a which is a first halftone corresponding to the light blocking part 220b, and a second halftone region 95b corresponding to the sub spacer SCS.

When the color filter layer 230 is exposed and provided through the optical mask 90, the light partially passes through the first halftone region 95a to form the light blocking part 220b, about 100% of the light passes through transparent region 95c to form the main spacer MCS, and a percentage of the light passes through the second halftone region 95b is less than the first halftone region 95a and greater than the transparent region 95a to form the sub spacer SCS.

According to the light blocking part 220b provided by using the first halftone region 95a having transmittance of about 16% of the light blocking member 220, a sub spacer SCS provided by using the second halftone region 95b having transmittance of about 19%, and the main spacer MCS provided by using the full-tone region 95c having transmittance of about 0%, thereby the first to third light blocking members 40, 50, and 60 may be selectively provided.

The first light blocking member 40 may be provided by using an optical mask having first transmittance of about 16% which is the same as that of the light blocking part 220b of the light blocking member 220 in a range of about 100 μm to about 200 μm with respect to the outermost pixel adjacent to the display pixel PX.

The second light blocking member 50 may be provided by using an optical mask having second transmittance of about 19% which is the same as that of the sub spacer SCS of the light blocking member 220 in a range of about 200 μm to about 800 μm with respect to the dummy pixel.

The third light blocking member 60 may be provided by using an optical mask having transmittance of about 100% which is the same as that of the main spacer MCS of the light blocking member 220 in a range after about 800 μm from the edge of the display area DA.

Hereinafter, an outermost part A of an LCD according to an exemplary embodiment of the invention will be described with reference to FIGS. 6 and 7.

Figure 6:
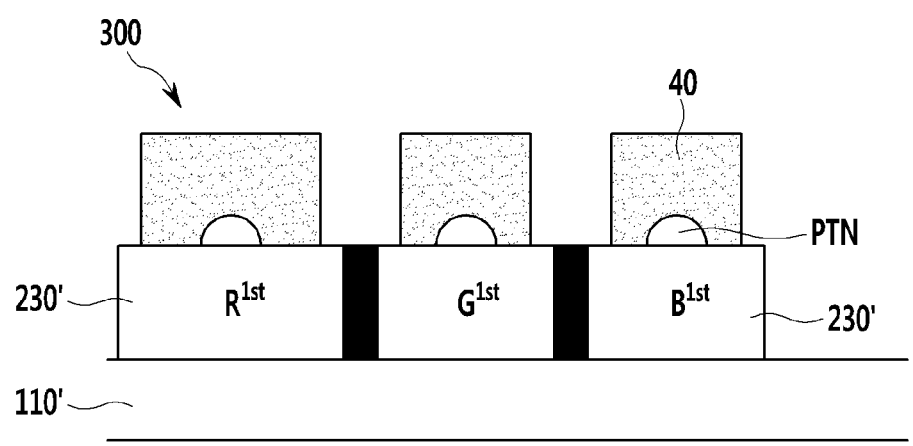
FIG. 6 is a cross-sectional view of FIG. 2 taken along line VI-VI.

FIG. 6 is a cross-sectional view of FIG. 2 taken along line VI-VI, and FIG. 7 is a cross-sectional view of FIG. 2 taken along line VII-VII.

As illustrated in FIG. 6, an LCD 300 according to an exemplary embodiment of the invention may be provided with the same thickness on respective color filter layers 230, that is, red $R^{1st}$, green $G^{1st}$, blue $B^{1st}$ of color filter layers 230' with respect to the first to third light blocking members 40, 50, and 60 which have the same distance from the outermost pixel PX of the display area.

Further, as illustrated in FIG. 7, in the LCD 300 according to the exemplary embodiment of the invention, a first light blocking member 40 provided in the first dead space area A1 in a range of approximately 100 μm to approximately 200 μm in a direction far form the outermost pixel PX of the display area, a second light blocking member 50 provided in the second dead space area A2, and a third light blocking member 60 provided in the third dead space area A3 may be differentially provided.

The first, second, and third light blocking members 40, 50, and 60 provided in the non-display area NDA in a direction far form the light blocking member 220 provided in the display area have first, second, third thicknesses D1, D2, and D3 in response to the transmittance of each region of the optical mask 90 used to form the light blocking part 220*b* of the light blocking member 220, the sub spacer SCS, and the main spacer MCS provided in the display area.

In response to the first, second, third thicknesses D1, D2, and D3 of the light blocking part 220*b* provided by using the first halftone region 95*a* having transmittance of about 16% of the optical mask 90, the sub spacer SCS provided by using the second halftone region 95*b* having transmittance of about 19%, and the main spacer MCS provided by using the full-tone region 95*c* having transmittance of about 100%, the first light blocking member 40 may be provided to have the first thickness D1 by using the optical mask having first transmittance of about 16% like the light blocking part 220*b* of the light blocking member 220 in the range of about 100 μm to about 200 μm with respect to the outermost pixel PX adjacent to the dummy pixel PX'.

The second light blocking member 50 may be provided to have a second thickness D2 by using an optical mask having second transmittance of about 19% which is the same as the sub spacer SCS of the light blocking member 220 in a range of about 200 μm to about 800 μm with respect to the dummy pixel.

The third light blocking member 60 may be provided to have a third thickness D3 by using the optical mask having the same third transmittance as the main spacer MCS of the light blocking part 220*b* up to the end from about 800 μm with respect to the first dead space region A1 where the diode or the pad part is included after the dummy pixel.

In an exemplary embodiment, only in the first and second light blocking members 40 and 50 among the first to third light blocking members 40, 50, and 60 on the dummy color filter layer 230' may be differentially provided therebelow.

In the exemplary embodiment, when the dummy color filter layer 230' has a blue color, it is preferred that a material of the light blocking member may not be mixed.

Since the dummy color filter layer 230' further has an upper protruding pattern, preferably a hemispherical pattern PTN on the upper surface, even though the first and second light blocking members 40 and 50 are provided with a halftone by reducing transmittance of a part of the optical mask, the dummy color filter layer 230' is not completely cured by the light, and when the step is provided by varying the CD and the thickness according to a developing time after exposure and a condition, the step may be compensated.

The dummy color filter layer 230' has an overlap region 61 between the third light blocking member 60, the overlap region 61 protrudes and overlaps upward therefrom with about 5 μm to about 10 μm when the third thickness D3 of the third light blocking member 60 is the same as the thickness D of the dummy color filter layer 230' to prevent the light leakage in the outermost pixel PX of the display area 500 of the LCD 300.

The overlap region 61 is disposed on the interface of the third light blocking member 60 and the second light blocking member 50 and may overlap upward toward the end portion of the dummy color filter layer 230' from the light blocking area of the third light blocking member 60.

Hereinafter, a manufacturing method of an LCD according to another exemplary embodiment of the invention will be briefly described with reference to FIG. 8.

Figure 8:
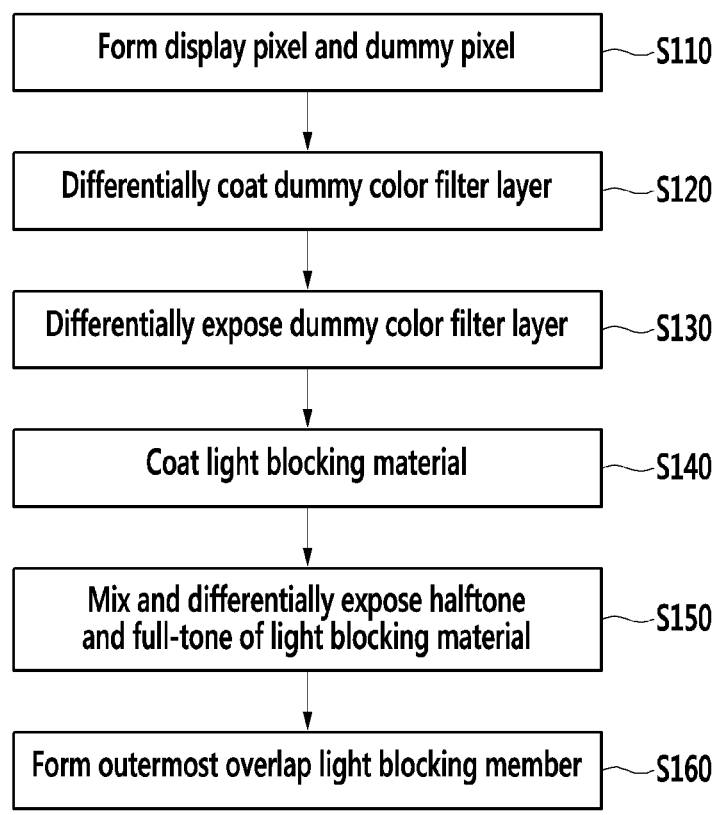
FIG. 8 is a flowchart for describing another exemplary embodiment of a manufacturing method of an LCD according to the invention.

FIG. 8 is a flowchart for describing a manufacturing method of a LCD according to another exemplary embodiment of the invention.

In a manufacturing method of an LCD according to another exemplary embodiment of the invention, a method of forming the first to third light blocking members 40, 50, and 60 in the non-display area NDA will be described.

First, display pixels PX displaying an image in a matrix form and dummy pixels 510, 511, and 512 which do not display the image are disposed on the lower substrate 110 (S110).

A gate conductor is disposed on the lower substrate 110, an insulating layer is disposed thereon, a semiconductor layer is disposed, an ohmic contact is disposed, a data conductor is disposed, an insulating layer is disposed thereon, and the color filter layer 230 is differentially extended up to the display pixel PX and the dummy pixel PX' of the second dead space region A2 to form the dummy color filter layer 230' (S120).

The dummy color filter layer 230' may be differentially exposed in order to form a stripe protruding pattern PTN having a hemispherical cross-section on the dummy color filter layer 230' (S130).

In this case, the optical mask for the color filter layer may use two tones.

A light blocking member material is coated in the display area 500 where the display pixel PX is positioned and the non-display area NDA having the first dead space area A1, the second dead space area A2, and the third dead space area A3 in a direction far away from the nearest display pixel PX (S140).

Subsequently, light is transmitted by using an optical mask 90 mixing and having a first halftone region 95*a*, a second halftone region 95*b*, and a transparent region 95*c* having transmittance of for example, about 16%, about 19%, and about 100% to form the first to third light blocking members 40, 50, and 60 having the first to third thicknesses D1, D2, and D3 (S150).

According to thicknesses of the light blocking part 220*b* of the light blocking member 220 of the display area DA, the sub spacer SCS, and the main spacer MCS, transmittance of the first halftone region 95*a*, the second halftone region 95*b*, and the transparent region 95*c* of the optical mask 90 used to form the light blocking part 220*b* of the light blocking member 220, the sub spacer SCS, and the main spacer MCS may be used.

In an exemplary embodiment, the first light blocking member 40 is provided in a range of about 100 μm to about 200 μm from the outermost pixel PX of the display area DA, and the second light blocking member 50 is provided in a range of about 200 μm to about 800 μm, and the third light blocking member 60 may be provided from about 800 μm to the end of the lower substrate 110, for example.

The first to third light blocking members 40, 50, and 60 may be provided by using an optical mask having first halftone, second halftone, and full tone regions having the first to third transmittance so that the transmittance is continuously and gradually increased or decreased.

The overlap region 61 is further provided between the third light blocking member 60 and the dummy color filter layer 230' (S160).

In the forming of the overlap region 61, a light blocking support layer 63 of the third light blocking member 60 is provided to be adjacent to the dummy color filter layer 230' by using a full-tone mask, and the overlap region 61 is provided to protrude from one edge of the light blocking support layer 63 and overlap with the edge of the second light blocking member 50 disposed on the dummy color filter lower support layer 230'.

In an exemplary embodiment, the overlap region 61 may be about 5 μm to about 10 μm, for example.

Hereinafter, referring to FIGS. 9A to 12, effects of preventing light leakage in the outermost pixel in the display area adjacent to the non-display area in the LCD according to the exemplary embodiment of the invention and preventing the gap defect and the torn pattern phenomenon of the light blocking area will be described.

Figure 9A:
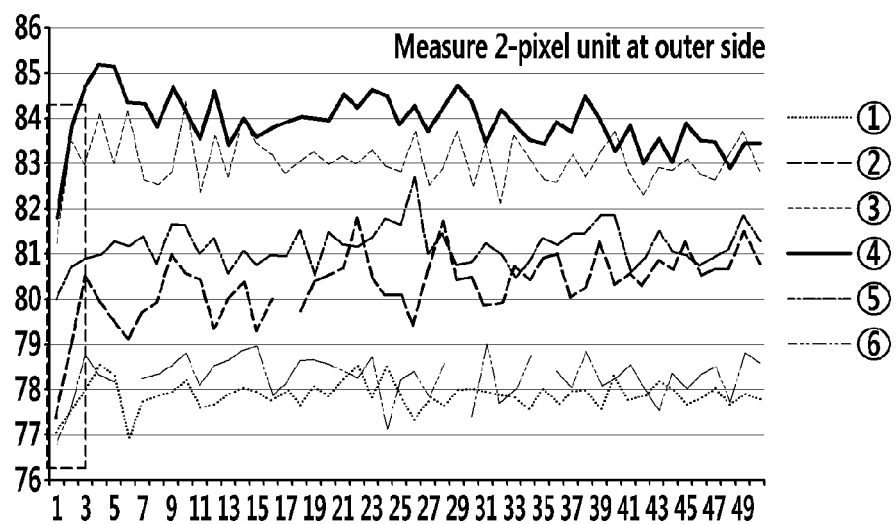
FIG. 9A is a graph illustrating each measurement position of the exemplary embodiment of a pixel in a display area adjacent to a non-display area and uniformity of a critical dimension ("CD") of each measurement position in the LCD according to the invention.
Figure 9A:
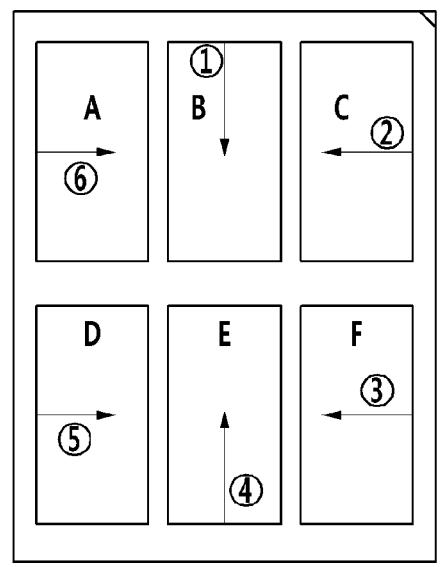
Figure 9B:
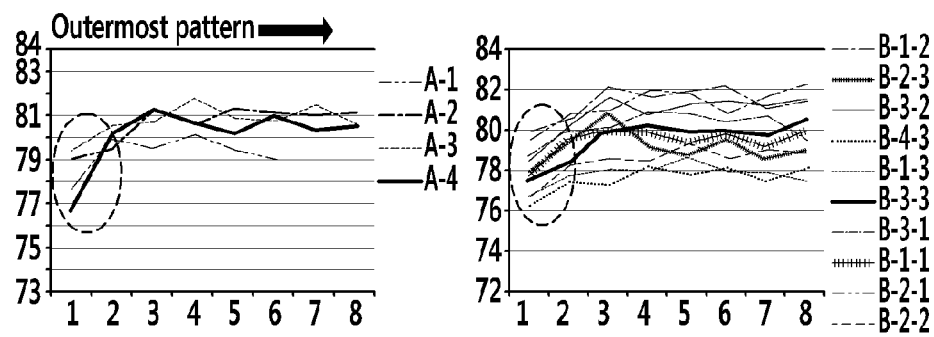
FIG. 9B is a graph illustrating a pixel of FIG. 9A and uniformity of the CD when the measurement position of each pixel is varied.
Figure 9B:
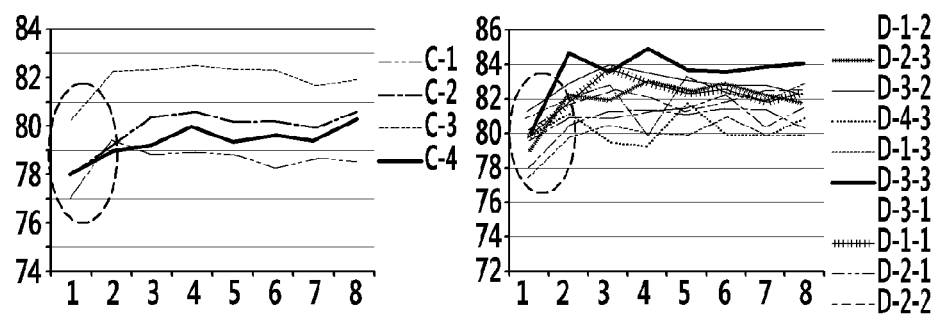
Figure 9B:
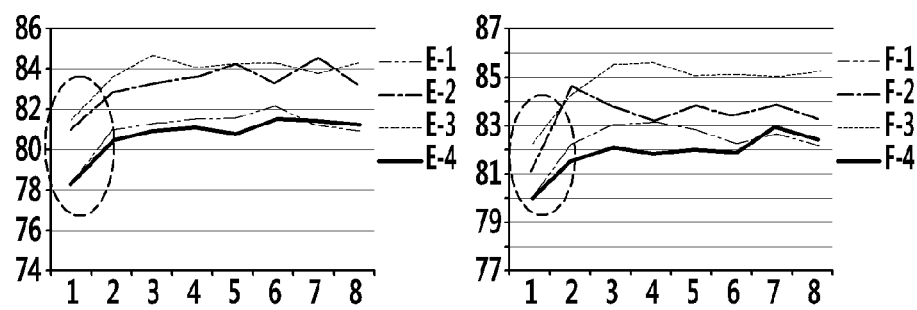

FIG. 9A is a graph illustrating CD uniformity at each measurement position of a pixel in a display area adjacent to a non-display area in the LCD according to the exemplary embodiment of the invention, and FIG. 9B is a graph illustrating a pixel of FIG. 9A and uniformity of the CD when the measurement position of each pixel is varied.

As illustrated in FIGS. 9A and 9B, with respect to pixels A, B, C, D, E, and F in the display area adjacent to the non-display area of the LCD according to the exemplary embodiment of the CDs are measured by using a mass-produced transparency meter ("TP") measuring machine, and as a result, since the CDs are smaller than a normal region by about 2 μm or less, it can be seen that the tearing phenomenon generated in the outermost pixels in the display area adjacent to the non-display area is prevented.

It can be seen that uniformity of the CDs smaller than a normal region by about 2 μm or less is shown as a result measured by varying the number of measuring pixels and a position in the measuring pixel as illustrated in FIG. 9B.

Figure 10:
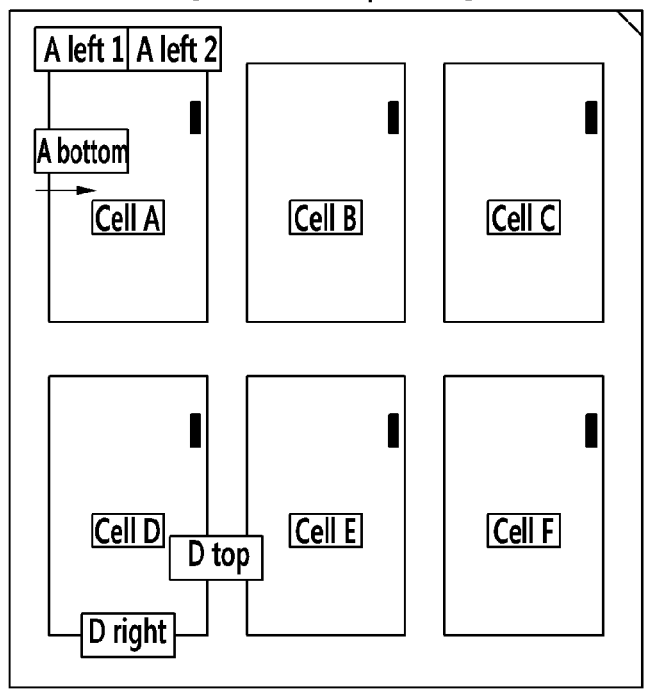
FIG. 10 is a graph illustrating each measurement position of the exemplary embodiment of a pixel in a display area adjacent to a non-display area and a height of a light blocking member to a top portion of each measurement position in the LCD according to the invention.
Figure 10:
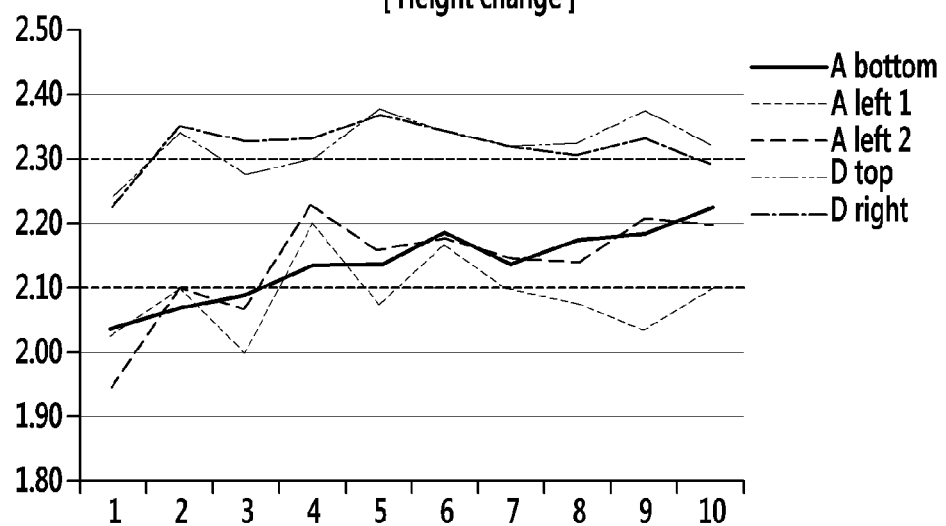

FIG. 10 is a graph illustrating each measurement position of a pixel in a display area adjacent to a non-display area and a height of a light blocking member to a top portion of each measurement position in the LCD according to the exemplary embodiment of the invention, and illustrates each measurement position of the pixel in the display area for measuring a height of the light blocking member.

Heights of pixels in the display area adjacent to the non-display area of the LCD according to the exemplary embodiment of the invention as compared with the normal area in each measurement position are measured and disclosed in Table 1 and illustrated in FIG. 10.

TABLE 1

| Classification | A bottom | A left 1 | A left 2 | D top | D right |
|---|---|---|---|---|---|
| 1 | 2.04 | 2.03 | 1.95 | 2.23 | 2.24 |
| 2 | 2.07 | 2.10 | 2.10 | 2.35 | 2.34 |

TABLE 1-continued

| Classification | A bottom | A left 1 | A left 2 | D top | D right |
|---|---|---|---|---|---|
| 3 | 2.09 | 2.01 | 2.07 | 2.33 | 2.28 |
| 4 | 2.13 | 2.20 | 2.23 | 2.33 | 2.30 |
| 5 | 2.14 | 2.08 | 2.16 | 2.37 | 2.38 |
| 6 | 2.19 | 2.17 | 2.18 | 2.34 | 2.34 |
| 7 | 2.14 | 2.09 | 2.15 | 2.32 | 2.32 |
| 8 | 2.17 | 2.08 | 2.14 | 2.31 | 2.32 |
| 9 | 2.19 | 2.03 | 2.21 | 2.33 | 2.37 |
| 10 | 2.23 | 2.10 | 2.20 | 2.30 | 2.32 |
| Average | 2.14 | 2.09 | 2.14 | 2.32 | 2.32 |
| Outermost side | 2.04 | 2.03 | 1.95 | 2.23 | 2.24 |
| Difference | 0.10 | 0.06 | 0.18 | 0.09 | 0.08 |

As illustrated in Table 1 and FIG. 10, with respect to a pixel A, at a bottom, a left 1, and a left 2, and a top and a right of a pixel D, heights of the light blocking member 220 are measured for each position. As a result, a difference of about 0.1 μm to about 0.2 μm or less is illustrated as compared with another normal area, and a step is not largely provided and thus substantially good.

Figure 11:
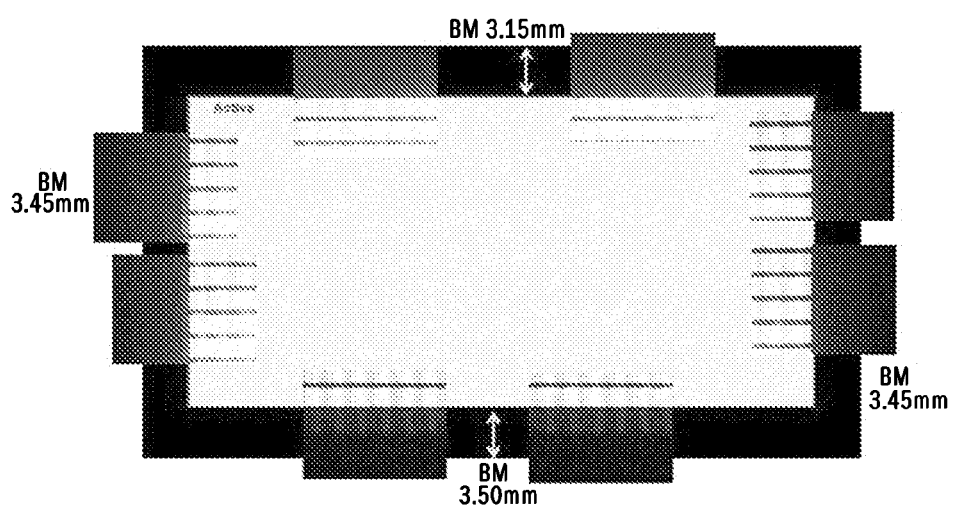
FIG. 11 is an actual image illustrating that light leakage is prevented at left, right, upper, and lower portions in the exemplary embodiment of a pixel in a display area adjacent to the non-display area in the LCD according to the invention.

Further, referring to Table 2 and FIG. 11, it can be seen that the light leakage is prevented even at the left and right where the thickness of the outermost light blocking area is about 3.15 millimeters (mm) in the pixel in the display area adjacent to the non-display area of the LCD according to the exemplary embodiment of the invention and even at the top where the thickness of the outermost light blocking area is about 3.15 μm, like the bottom where the largest thickness of the outermost light blocking area is about 5.0 mm.

TABLE 2

| Position | Existence of light leakage |
|---|---|
| outermost top | x |
| outermost bottom | x |
| outermost left | x |
| outermost right | x |

Figure 12:
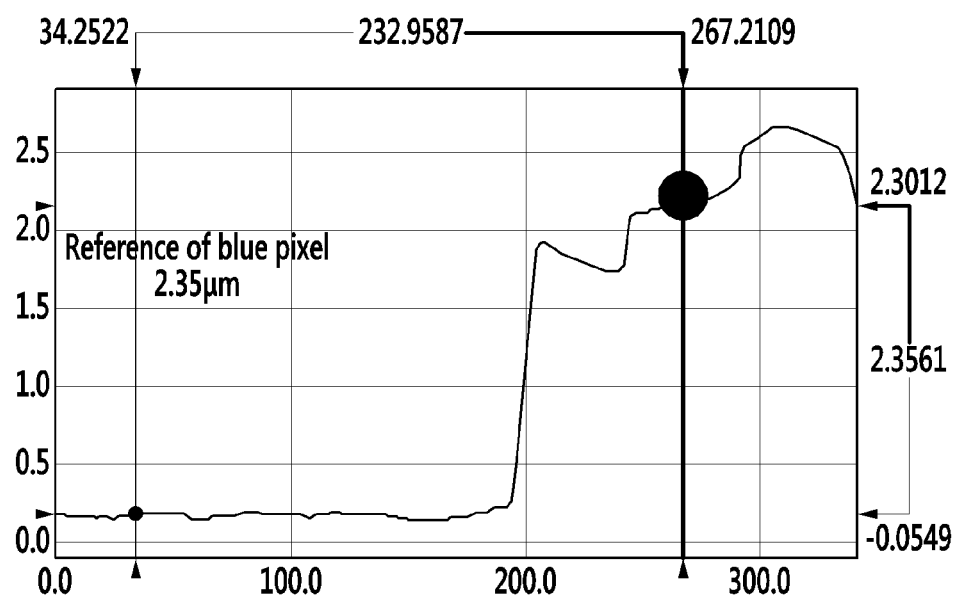
FIG. 12 is a graph illustrating that a step is decreased according to a light blocking part applying halftone transmittance in an outermost light blocking area in the exemplary embodiment of the LCD according to the invention.

FIG. 12 is a graph illustrating that a step of an outermost light blocking member is decreased by mixing and applying halftone transmittance in the non-display area in the LCD according to the exemplary embodiment of the invention.

As illustrated in FIG. 12, the overlap region of the third light blocking member of the LCD according to the exemplary embodiment of the invention overlaps with the second halftone region of the second light blocking member, and while the second halftone region is in a non-cured state, the step is reduced within about 2.4 μm according to a curing time or condition, as a result, the gap defect may be prevented and the SUA factor where the void of the interface in which the liquid crystal layer is not filled is generated may be removed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A liquid crystal display, comprising:
 a lower substrate including a display area and a non-display area positioned in at least one side outside the display area;

a plurality of pixels positioned on the lower substrate and including:
display pixels which are positioned in the display area and display an image; and
dummy pixels which do not display the image; and
a light blocking member positioned on the lower substrate,
wherein the non-display area includes a first dead space area adjacent to the display area and having a dummy area where the dummy pixels are positioned, a second dead space area adjacent to the first dead space area, and a third dead space area adjacent to the second dead space area,
the light blocking member includes a first light blocking member positioned in the first dead space area, a second light blocking member positioned in the second dead space area, and a third light blocking member positioned in the third dead space area, and
the first to third light blocking members have first to third thicknesses provided by using an optical mask in which at least one halftone region and a full-tone region are mixed.

2. The liquid crystal display of claim 1, wherein:
the first to third thicknesses of the first, second, third light blocking members, respectively, correspond to thicknesses of a light blocking part of the light blocking member of the display area, a sub spacer and a main spacer in the display area.

3. The liquid crystal display of claim 2, wherein:
the first thickness of the first light blocking member corresponds to the thickness of the light blocking part, and the second thickness of the second light blocking member corresponds to the thickness of the sub spacer.

4. The liquid crystal display of claim 3, wherein:
a first halftone region of the at least one halftone region has transmittance of about 16 percent, and a second halftone region of the at least one halftone region has transmittance of about 19 percent.

5. The liquid crystal display of claim 2, wherein:
the first thickness to third thickness are gradually increased or decreased.

6. The liquid crystal display of claim 1, wherein:
the first light blocking member is provided within about 100 micrometers to about 200 micrometers from the outermost pixel, the second light blocking member is provided within about 200 micrometers to about 800 micrometers from the outermost pixel, and the third light blocking member is provided within about 800 micrometers from the outermost pixel to the end of the lower substrate.

7. The liquid crystal display of claim 1, wherein:
a dummy color filter layer is differentially provided from the third light blocking member below the first and second light blocking members.

8. The liquid crystal display of claim 7, wherein:
the dummy color filter layer has an upper protruding pattern.

9. The liquid crystal display of claim 8, wherein:
the upper protruding pattern includes a stripe pattern of which a cross section has a hemispherical shape.

10. The liquid crystal display of claim 9, wherein:
the third light blocking member includes a light blocking support layer having the same thickness as that of the dummy color filter layer, and an overlap region overlapping the second light blocking member.

11. The liquid crystal display of claim 10, wherein:
a width of the overlap region is about 5 to about 10 micrometers.

* * * * *